(12) United States Patent
Kasztelan et al.

(10) Patent No.: US 6,231,750 B1
(45) Date of Patent: *May 15, 2001

(54) HYDROCRACKING CATALYST COMPRISING A BETA ZEOLITE AND A GROUP VB ELEMENT

(75) Inventors: Slavik Kasztelan, Rueil Malmaison; Eric Benazzi, Chatou; Nathalie Marchal-George, Saint Genis Laval, all of (FR)

(73) Assignee: Institut Francais du Petrole (FR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/344,344

(22) Filed: Jun. 25, 1999

(30) Foreign Application Priority Data

Jun. 25, 1998 (FR) .................................................. 98 08040
Jun. 25, 1998 (FR) .................................................. 98 08041

(51) Int. Cl.[7] ......................... C10G 47/06; B01J 27/049
(52) U.S. Cl. ............................... 208/111.01; 208/111.01; 208/11.2; 208/111.3; 502/204; 502/206; 502/210; 502/213; 502/219; 502/220; 502/221; 502/246; 502/248; 502/254; 502/255; 502/258; 502/259; 502/311; 502/312; 502/313; 502/314; 502/315; 502/353; 502/354
(58) Field of Search ..................... 502/66, 79, 202, 502/204, 206, 207, 208, 210, 211, 213, 214, 219, 220, 221, 222, 246, 248, 254, 255, 258, 259, 260, 263, 311, 312, 314, 315, 325, 327, 332, 353, 354; 208/111.01

(56) References Cited

U.S. PATENT DOCUMENTS

| 3,909,393 | * | 9/1975 | Michel ................................. 208/139 |
| 4,582,595 | * | 4/1986 | Audeh et al. .................... 208/216 R |
| 4,777,157 | | 10/1988 | Koepke et al. ......................... 502/66 |
| 4,855,036 | * | 8/1989 | Chiang et al. ........................ 208/120 |
| 4,871,445 | | 10/1989 | Koepke et al. .......................... 208/89 |
| 4,908,344 | * | 3/1990 | Pereira et al. ........................ 502/313 |
| 5,166,111 | * | 11/1992 | Zones et al. ........................... 502/64 |
| 5,275,994 | * | 1/1994 | Weissman et al. .................. 502/171 |
| 5,294,333 | * | 3/1994 | Brysse et al. ........................ 208/215 |
| 5,378,670 | * | 1/1995 | Kumar .................................. 502/60 |
| 5,756,802 | * | 5/1998 | Li et al. ............................... 558/319 |
| 5,961,816 | * | 10/1999 | Benazzi et al. .................... 208/111.3 |
| 5,997,725 | * | 12/1999 | Benazzi et al. .................... 208/111.3 |
| 6,071,402 | * | 6/2000 | Danot et al. .......................... 208/112 |

FOREIGN PATENT DOCUMENTS

| 0 051 346 | 5/1982 | (EP) . |
| 0 216 443 | 4/1987 | (EP) . |
| 95/26928 | 10/1995 | (WO) . |

* cited by examiner

*Primary Examiner*—Bekir L. Yildirim
(74) *Attorney, Agent, or Firm*—Millen, White, Zelano & Branigan, P.C.

(57) ABSTRACT

The invention provides a hydrocracking catalyst comprising at least one mineral matrix, at least one beta zeolite, at least one group VB element or at least one mixed sulphide phase comprising sulphur, optionally at least one group VIB or group VIII element, optionally at least one element selected from the group formed by silicon, boron or phosphorous, and optionally at least one group VIIA element.

23 Claims, No Drawings

HYDROCRACKING CATALYST COMPRISING A BETA ZEOLITE AND A GROUP VB ELEMENT

The present invention relates to a catalyst for hydrocracking hydrocarbon feeds, said catalyst comprising at least one amorphous or low crystallinity oxide type matrix, at least one element (metal) from group VB (group 5 in the new notation of the periodic table: "Handbook of Chemistry and Physics", $76^{th}$ edition, 1995–1996, inside front cover), preferably niobium, at least one beta zeolite, at least one promoter element selected from the group formed by boron, phosphorous and silicon, optionally at least one element (metal) selected from group VIB and/or group VIII (group 6 and groups 8, 9 and 10 in the new notation for the periodic table), preferably molybdenum, tungsten, cobalt, nickel or iron. The catalyst also optionally comprises at least one element from group VIIA (group 17 in the new notation for the periodic table), for example fluorine.

The present invention also relates to a catalyst for hydrocracking hydrocarbon feeds, said catalyst comprising at least one beta zeolite, at least one matrix selected from the group formed by mineral matrices, preferably oxide type mineral matrices, preferably amorphous or of low crystallinity and generally porous, at least one mixed sulphide phase comprising sulphur and at least one element from group VB of the periodic table (group 5 in the new notation of the periodic table: "Handbook of Chemistry and Physics", $76^{th}$ edition, 1995–1996, inside front cover), such as tantalum, niobium or vanadium, preferably niobium, and at least one element from group VIB of the periodic table (group 6) such as chromium, molybdenum or tungsten, more preferably molybdenum. The catalyst can also optionally comprise at least one metal from group VIII of the periodic table (groups 8, 9 and 10), such as iron, cobalt, nickel, ruthenium, osmium, rhodium, iridium, palladium, platinum, and optionally at least one element selected from the group formed by silicon, boron or phosphorous, and optionally at least one element from group VIIA of the periodic table (group 17), such as fluorine, chlorine, bromine or iodine, preferably fluorine.

The present invention also relates to processes for preparing said catalyst, and to its use for hydrocracking hydrocarbon feeds such as petroleum cuts, cuts originating from coal containing aromatic compounds and/or olefinic compounds and/or naphthenic compounds and/or paraffinic compounds, the feeds possibly containing metals and/or nitrogen and/or oxygen and/or sulphur.

Hydrocracking heavy petroleum feeds is a very important refining process which produces lighter fractions such as gasoline, jet fuel and light gas oil from surplus heavy feeds, which lighter fractions are needed by the refiner to enable production to be matched to demand. Some hydrocracking processes can also produce a highly purified residue which can constitute an excellent base for oils. The advantage of catalytic hydrocracking over catalytic cracking is that it can provide very good quality middle distillates, jet fuels and gas oils. The gasoline produced has a much lower octane number than that resulting from catalytic cracking.

All catalysts used for hydrocracking are bifunctional, combining an acid function and a hydrogenation function. The acid function is supplied by large surface area supports (150 to 800 m$^2$/g in general) with a superficial acidity, such as halogenated aluminas (in particular fluorinated or chlorinated), combinations of boron and aluminium oxides, amorphous silica-aluminas and clays. The hydrogenating function is supplied either by one or more metals from group VIII of the periodic table, such as iron, cobalt, nickel, ruthenium, rhodium, palladium, osmium, iridium or platinum, or by a combination of at least one metal from group VI of the periodic table, such as molybdenum or tungsten, and at least one group VIII metal.

The equilibrium between the two, acid and hydrogenating, functions is the fundamental parameter which governs the activity and selectivity of the catalyst. A weak acid function and a strong hydrogenating function produces low activity catalysts which generally operate at a high temperature (390° C. or above), and at a low supply space velocity (HSV, expressed as the volume of feed to be treated per unit volume of catalyst per hour, and is generally 2 or less), but have very good selectivity for middle distillates. In contrast, a strong acid function and a weak hydrogenating function produces very active catalysts but selectivities for middle distillates are poor. The search for suitable catalysts thus revolves around the proper selection of each of the functions to adjust the activity/selectivity balance of the catalyst.

Thus one of the great interests of hydrocracking is to have a high degree of flexibility at various levels: flexibility as regards the catalysts used, which provides flexibility in the feeds to be treated and in the products obtained. One parameter which is easily mastered is the acidity of the catalyst support.

The vast majority of conventional hydrocracking catalysts are constituted by low acidity supports such as amorphous silica-aluminas. These systems are more particularly used to produce very high quality middle distillates and again, when their acidity is very low, base oils.

Amorphous silica-aluminas are low acidity supports. Many of the catalysts in the hydrocracking industry are based on silica-alumina associated either with a group VIII metal or, as is preferably when the heteroatomic poison content in the feed to be treated exceeds 0.5% by weight, a combination of sulphides of group VIB and VIII metals. These systems have very good selectivity for middle distillates, and good quality products are formed. The least acid of such catalysts can also produce lubricating bases. The disadvantage of all of such catalytic systems based on an amorphous support is, as has been stated, their low activity; Further, simple sulphides of group VB elements have been described as constituents for catalysts for hydrorefining hydrocarbon feeds, such as by niobium trisulphide in U.S. Pat. No. 5,294,333. Mixtures of simple sulphides comprising at least one group VB element and a group VIB element have also been tested as constituents for catalysts for hydrorefining hydrocarbon feeds as described, for example, in U.S. Pat. No. 4,910,181 or U.S. Pat. No. 5,275,994.

The research carried out by the Applicant on zeolites and on active hydrogenating phases have led the Applicant to the discovery that, surprisingly, catalysts for hydrocracking hydrocarbon feeds comprising:

either at least one amorphous or low crystallinity matrix which is generally porous such as alumina, at least one element from group VB of the periodic table, such as tantalum, niobium or vanadium, preferably niobium, at least one beta zeolite, at least one promoter element selected from the group formed by boron, phosphorous and silicon;

or at least one matrix selected from the group formed by mineral matrices, preferably oxide type mineral matrices, preferably amorphous or of low crystallinity and generally porous such as alumina, at least one beta zeolite, and at least one mixed sulphide phase. This catalyst can also optionally comprise at least one element from group VIII, optionally an element selected from the group formed by silicon, phosphorous and boron, and optionally at least one element selected from group VIIA.

The catalyst of the invention comprises at least one beta zeolite which is preferably at least partially in its hydrogen form. The term "beta zeolite" means zeolites with a BEA structure type as described in the "Atlas of Zeolite Structure Types", W. M Meier, D. H. Olson and Ch. Baerlocher, 4$^{th}$ revised edition, 1996, Elsevier.

The catalyst also comprises at least one element from group VIB of said periodic table such as chromium, molybdenum and tungsten, preferably molybdenum or tungsten, more preferably still molybdenum, optionally a group VIII element i.e., an element selected from the group formed by: Fe, Ru, Os, Co, Rh, Ir, Ni, Pd, Pt, preferably iron, cobalt, nickel or ruthenium, and optionally a group VIIA element, preferably fluorine. The catalyst has a higher hydrocracking activity than those of known prior art catalytic formulae based on a group VIB element.

The mixed sulphide optionally present in the catalyst of the invention is characterized by the following approximate general formula:

$$A_x B_{1-x} S_y$$

where:
x is a number in the range 0.001 to 0.999, preferably in the range 0.005 to 0.995, more preferably 0.05 to 0.95;
y is a number in the range 0.1 to 8, preferably in the range 0.1 to 6, more preferably 0.5 to 4;
A is a group VB element such as tantalum, niobium or vanadium, preferably niobium;
B is an element selected from group VIB such as chromium, molybdenum or tungsten, preferably molybdenum or tungsten, more preferably molybdenum.

The catalyst of the invention can be in a supported form, i.e., comprising at least one support constituted by at least one matrix, for example an oxide type matrix, for example alumina, and at least one beta zeolite.

The catalyst of the present invention can generally comprise, in % by weight with respect to the total catalyst mass:
  0.1% to 99.8%, preferably 0.1% to 90%, more preferably 0.1% to 80%, still more preferably 0.1% to 70% of at least one beta zeolite;
  0.1% to 60%, preferably 0.1% to 50%, and more preferably 0.1% to 40%, of at least one element selected from group VB;
  0.1% to 99%, preferably 1% to 99%, of at least one porous amorphous or low crystallinity oxide type mineral matrix;
  0.1% to 20%, preferably 0.1% to 15%, more preferably 0.1% to 10%, of at least one promoter element selected from the group formed by boron, phosphorous and silicon, not including the silicon which may be contained in the zeolite;
the catalyst also possibly comprising:
  0 to 60%, preferably 0.1% to 50%, more preferably 0.1% to 40%, of at least one element selected from elements from group VIB and group VIII; and
  0 to 20%, preferably 0.1% to 15%, more preferably 0.1% to 10%, of at least one element selected from group VIIA, preferably fluorine.

When it is present, the promoter element silicon is in the amorphous form and principally located on the matrix. The group VB, VIB and VIII elements in the catalyst of the present invention can be partially or completely present in the metallic and/or oxide and/or sulphide form.

When it contains a mixed sulphide phase, the catalyst of the present invention generally comprises, in % by weight with respect to the total catalyst mass:
  0.1% to 99.9%, preferably 1% to 99.5%, more preferably 5% to 99.0%, of at least one matrix, preferably an oxide type matrix, preferably amorphous or of low crystallinity and generally porous;
  0.1% to 99.8%, preferably 0.1% to 90%, more preferably 0.1% to 80%, still more preferably 0.1% to 70%, of at least one beta zeolite, with an overall silicon/aluminium (Si/Al) atomic ratio which is preferably higher than about 10, more preferably in the range 10 to 200, and more preferably still in the range 10 to 150;
  0.1% to 99.5%, preferably 0.5% to 99%, more preferably 1% to 90%, of at least one mixed sulphide of at least one group VB element and at least one group VIB element;
the catalyst possibly further containing:
  0 to 30%, preferably 0 to 25%, more preferably 0.1% to 20%, of at least one group VIII metal;
  0 to 20%, preferably 0 to 15%, more preferably 0.1% to 15%, of at least one element selected from the group formed by boron, phosphorous and silicon; and
  0 to 15%, preferably 0.1% to 15%, more preferably 0.1% to 10%, of at least one element selected from group VIIA, preferably fluorine.

The matrix is preferably selected from the group formed by mineral matrices, preferably porous mineral matrices, preferably amorphous or of low crystallinity, preferably an oxide type matrix.

The mixed sulphide is generally identified from an X ray diffraction diagram. It can also be identified from determining the metal-metal distance measured by an X ray absorption technique or Extended X ray Absorption Fine Structure (EXAFS). As an example, for a mixed sulphide of molybdenum and niobium, EXAFS identification determines the niobium-niobium distances or the niobium-molybdenum distances if the EXAFS analysis is carried out using the niobium K edge. It can also determine the molybdenum-molybdenum and molybdenum-niobium distances if the EXAFS analysis is carried out using the molybdenum K edge.

The X ray diffraction diagram was obtained using an INEL diffractometer with a curved multidetector using a conventional powder technique with the monochromatic K alpha 1 line of copper. From the position of the diffraction peaks represented by the angle 2 theta, the Bragg relationship is used to calculate the characteristic interplanar distances $d_{hkl}$ of the sample and the lattice parameters of the mixed phase a and c in Å (1 Å=1 Angström=$10^{-10}$ m). The lattice parameter "a" represents the average metal-metal distance between two neighbouring ions and is characteristic of the existence of a mixed phase. The structural type can also be determined by diffraction. Thus, for example, for a mixed sulphide of molybdenum and niobium, simple sulphides of Mo and Nb, $MoS_2$ and $NbS_2$, both exist in the form of two structural types, the hexagonal form 2s and the rhombohedral form 3s. For molybdenum-rich samples (x<0.5), the mixed phase tends to crystallise in the hexagonal type structure 2s and the lattice parameters vary linearly as a function of the proportion of niobium in the mixed phase as shown in Table 1. For niobium-rich samples (x>=0.5), the mixed phase tends to crystallise in the rhombohedral structure 3s and the lattice parameters also vary linearly as a function of the niobium composition as shown in Table 2.

The error in the measurement of delta ($d_{hkl}$) can be estimated as a function of the absolute error in the measurement of angle 2 theta, using the Bragg relationship. An absolute error delta(2theta) of ±0.05° is normally acceptable. The intensity $I_{rel}$ at each value of $d_{hkl}$ is measured from the surface area of the corresponding diffraction peak.

TABLE 1

| Phase | a (Å) | c (Å) |
|---|---|---|
| $MoS_2$-2s | 3.16 | 12.29 |
| $Nb_{0.2}Mo_{0.8}S_2$ | 3.20 | 12.05 |
| $Nb_{0.3}Mo_{0.5}S_2$ | 3.22 | 12.02 |
| $Nb_{0.4}Mo_{0.6}S_2$ | 3.25 | 12.00 |
| $NbS_2$-2s | 3.31 | 11.89 |

TABLE 2

| Phase | a (Å) | c (Å) |
|---|---|---|
| $MoS_2$-2s | 3.16 | 18.37 |
| $Nb_{0.6}Mo_{0.4}S_2$ | 3.25 | 18.00 |
| $Nb_{0.7}Mo_{0.3}S_2$ | 3.27 | 17.98 |
| $Nb_{0.8}Mo_{0.2}S_2$ | 3.30 | 17.97 |
| $NbS_2$-2s | 3.33 | 17.81 |

Analysis of the X ray diffraction diagram in the form of the lattice parameters shown in Tables 1 and 2 leads to identification of the mixed niobium and molybdenum sulphide.

EXAFS analysis was carried out at the niobium K edge using synchrotron radiation between 18850 and 19800 eV measuring the absorbed intensity using a powder sample deposited on an adhesive strip. The absorption spectrum was analysed using an established procedure (F. W. Lyttle, D. E. Sayers and E. A Stern, Physical Review B, vol 11, page 4825, 1975 and E. A. Stem, D. E. Sayers and F. W. Lyttle, Physical Review B, vol 11, page 4836) which allowed the interatomic distances to be determined.

Analysis of the X ray absorption spectrum led to a deduction of a radial distribution function. This radial distribution showed a first peak relative to the sulphur environment of the niobium the maximum position of which gave the niobium-sulphur distance or R1 as generally 2.45 Å to 2.48 Å, typical of $NbS_2$. On this radial distribution a second peak could be seen which corresponded to the second co-ordination sphere of the niobium composed of niobium or molybdenum atoms which could not be distinguished because of their very close atomic numbers, the position of the maximum of which gave the average metal-metal distance R2 (niobium-niobium or niobium-molybdenum), which value varies as a function of the composition of the mixed phase as shown in Table 3; that value is between the niobium-niobium distance in $NbS_2$ (3.33 Å) and the molybdenum-molybdenum distance in $MoS_2$ (3.16 Å), and is generally an average of 3.20 to 3.35 Å. This distance agrees with the distances a determined by X ray diffraction and varies with the composition of the mixed phase. The distances reported in Table 3 are corrected for phase offset and can thus be compared with the data obtained by X ray diffraction. Determination of interatomic metal-metal distances by EXAFS is very accurate since the absolute error estimated for the distance is ±0.02 Å.

TABLE 3

| Phase | R3 (Å) | R2 (Å) |
|---|---|---|
| $Nb_{0.2}Mo_{0.8}S_2$ | 2.46 | 3.20 |
| $Nb_{0.3}Mo_{0.7}S_2$ | 2.45 | 3.22 |
| $Nb_{0.4}Mo_{0.6}S_2$ | 2.48 | 3.27 |
| $Nb_{0.6}Mo_{0.4}S_2$ | 2.47 | 3.28 |
| $Nb_{0.7}Mo_{0.3}S_2$ | 2.47 | 3.30 |
| $Nb_{0.8}Mo_{0.2}S_2$ | 2.48 | 3.31 |
| $NbS_2$ | 2.48 | 3.33 |

The catalysts of the invention can be prepared using any of the methods known to the skilled person.

A first preferred process for preparing the catalyst of the present invention comprises the following steps:

a) drying and weighing a solid termed the precursor, comprising at least the following compounds: at least one matrix, at least one beta zeolite, optionally at least one promoter element selected from the group formed by boron, phosphorous and silicon, optionally at least one element selected from group VIB and group VIII elements, optionally at least one element from group VIIA, this preferably being formed;

b) the dry solid obtained in step a) is calcined at a temperature of at least 150° C., preferably at least 450° C.;

c) the solid precursor defined in step b) is impregnated with a solution containing at least one group VB element, preferably niobium;

d) the moist solid is left in a humid atmosphere at a temperature in the range 10° C. to 120° C.;

e) the moist solid obtained in step d) is dried at a temperature in the range 60° C. to 150° C.;

f) the dried solid from step e) is calcined in dry air at a temperature of at least 150° C., preferably at least about 250° C.

The solid obtained from any one of steps a) to e) can be impregnated with at least one solution containing all or at least a portion of the element selected from the group VIB and group VIII elements, optionally at least one promoter element selected from the group formed by boron, phosphorous and silicon and optionally at least one group VIIA element.

The precursor of step a) above can be prepared using any of the conventional methods known to the skilled person. In a preferred preparation process, the precursor is obtained by mixing at least one matrix and at least one beta zeolite, then is formed, dried and calcined. The promoter element or elements selected from the group formed by boron, phosphorous and silicon, that or those selected from elements from groups VIB, VIII and/or from group VIIA elements, are then introduced by any method which is known to the skilled person, at any one of steps a) to e), before or after forming and before or after calcining the mixture.

Forming can be carried out, for example, by extrusion, pelletisation, using the oil-drop method, by rotating plate granulation or by any other method which is known to the skilled person. At least one calcining step can be carried out after any one of the preparation steps; it is normally carried out in air at a temperature of at least 150° C., preferably at least 300° C. Thus the product obtained from step a) and/or step e) and/or after optional introduction of the element or elements selected from the elements from groups VIB, VIII and/or from promoter elements from the group constituted by boron, phosphorous and silicon, and/or from group VIIA elements, is then optionally calcined in air, usually at a temperature of at least 150° C., preferably at least 250° C., more preferably between about 350° C. and 1000° C.

The hydrogenating element can be introduced at any step in the preparation, preferably during mixing, or more preferably after forming. Forming is followed by calcining; the hydrogenating element is introduced before or after this calcining step. In all cases, the preparation is finished by calcining at a temperature of 250° C. to 600° C. One preferred method in the present invention consists of mixing at least one zeolite in a moist alumina gel for several tens of minutes, then passing the paste obtained through a die to form extrudates with a diameter in the range 0.4 to 4 mm. The hydrogenating function can then be introduced only in part (for example, when using combinations of oxides of group VIB and VIII metals) or completely at the moment of mixing the zeolite, i.e., at least one beta zeolite, with at least one gel of the oxide selected as the matrix. It can be introduced by one or more ion exchange operations carried out on the calcined support constituted by at least one zeolite dispersed in at least one matrix, using solutions containing precursor salts of the selected metals when these are group VIII metals. It can be introduced by one or more operations for impregnating the formed and calcined support, using, a solution of precursors of oxides of metals from group VIII (in particular cobalt and nickel) when the precursors of the oxides of group VIB metals (in particular molybdenum or tungsten) have previously been introduced on mixing the support. Finally, it can be introduced by one or more impregnation operations carried out on the calcined support constituted by at least one beta zeolite and at least one matrix, using solutions containing precursors of oxides of groups VIB and/or VIII metals, the precursors of the oxides of the group VIII metals preferably being introduced after those of group VIB or at the same time as the latter.

A further preferred preparation process consists of introducing at least one group VB element and at least one element selected from group VIII and group VIB elements into a mixture of at least one matrix with at least one beta zeolite, before or after forming and before or after calcining said mixture.

Preferably, the support is impregnated with an aqueous solution. The support is preferably impregnated using the incipient wetness impregnation method which is well known to the skilled person. Impregnation can be carried out in a single step using a solution containing all of the constituent elements of the finished catalyst.

The boron and/or phosphorous and/or silicon and the optional element selected from group VIIA, the halide ions, preferably fluorine, can be introduced into the catalyst at a variety of stages of the preparation using any technique which is known to the skilled person.

One preferred method of the invention consists of depositing, for example by impregnation, the selected promoter element or elements, for example boron-silicon, onto the calcined or uncalcined precursor, preferably the calcined precursor. To this end, an aqueous solution of at least one boron salt such as ammonium biborate or ammonium pentaborate is prepared in an alkaline medium and in the presence of hydrogen peroxide and dry impregnation is carried out, in which the pore volume of the precursor is filled with the solution containing boron. When silicon is deposited, for example, a solution of a silicone type silicon compound is used.

The boron and silicon can also be deposited simultaneously using, for example, a solution containing a boron salt and a silicone type silicon compound. Thus, for example in the case where the precursor is a nickel-molybdenum type catalyst supported on alumina and the zeolite is selected from the group formed by beta zeolites, it is possible to impregnate this precursor with an aqueous solution of ammonium biborate and Rhodorsil E1P silicone from Rhone Poulenc, to dry, for example at 80° C., then to impregnate with a solution of ammonium fluoride, to dry, for example at 80° C., and to calcine, for example and preferably in air in a traversed bed, for example at 500° C. for 4 hours. The group VB element is then deposited using any method known to the skilled person.

The promoter element selected from the group formed by boron, phosphorous and silicon, and the element selected from the halogens of group VIIA, can also be introduced by one or more impregnation operations, for example using an excess of solution, carried out on the calcined precursor.

Thus, for example, it is possible to impregnate the precursor with an aqueous solution of ammonium biborate and/or Rhodorsil EP1 silicone from Rhone Poulenc, to dry at 80° C., for example, then to impregnate with an ammonium fluoride solution, to dry, for example at 80° C., and then to calcine, for example and preferably in air in a traversed bed, for example at 500° C. for 4 hours. Then the group VB element is deposited using any method which is known to the skilled person.

Other impregnation sequences can be carried out to obtain the catalyst of the present invention.

As an example, it is possible to impregnate the precursor with a solution containing the promoter elements (B, P, Si), to dry, to calcine then to impregnate the solid obtained with the solution containing a further promoter element, to dry, then to calcine. It is also possible to impregnate the precursor with a solution containing two promoter elements, to dry, to calcine then to impregnate the solid obtained with the solution containing the other promoter element, to dry, and then to carry out the final calcining step. The group VB element is then deposited using any method which is known to the skilled person.

Niobium impregnation can be facilitated by adding oxalic acid and possibly ammonium oxalate to the niobium oxalate solutions. Other compounds can be used to improve solubility and facilitate impregnation of the niobium, as is well known to the skilled person.

Sulphurisation can be carried out using any method which is known to the skilled person. The preferred method of the invention consists of heating the uncalcined catalyst in a stream of a hydrogen-hydrogen sulphide mixture or in a stream of a nitrogen-hydrogen sulphide mixture or in pure hydrogen sulphide at a temperature in the range 150° C. to 800° C., preferably in the range 250° C. to 600° C., generally in a traversed bed reaction zone.

When it contains a mixed sulphide phase, the catalyst of the invention can be prepared either by firstly preparing the bulk mixed sulphide phase and then depositing it on a support, or by directly generating a precursor of the catalyst consisting of a supported mixed sulphide phase. The optional elements which may be present (group VIII elements, elements selected from the group formed by silicon, phosphorous and boron, group VIIA elements) can be introduced at any stage of the preparation, for example during preparation of the bulk or supported mixed sulphide phase, or to the support alone.

A preferred process for preparing the bulk mixed sulphide comprised in the catalyst of the present invention comprises the following steps:

a) forming a reaction mixture which comprises at least the following compounds: at least one source of a group VB element, at least one source of a group VIB element, optionally water, optionally at least one source of an element selected from the group formed by group VIII elements, optionally at least one source of an element selected from the group formed by silicon, phosphorous and boron, and optionally an element selected from the halogens, i.e., group VIIA elements, preferably fluorine;

b) maintaining said mixture at a heating temperature which is generally over about 40° C., at a pressure which is at least equal to atmospheric pressure and in the presence of a sulphur compound until the mixed sulphide is obtained.

The mixture formed in step a) above can be produced simultaneously or successively, in any order, in the same physical space or separately.

Step b) has proved to be very difficult to carry out in the majority of conventional sulphurisation processes which are known to the skilled person.

The sulphurisation of solids containing at least one group VB element in the oxide form has been proved to be very difficult to carry out in the majority of conventional sulphurisation processes which are known to the skilled person. Catalysts containing at least one group VB element supported on an alumina type matrix are known to be very difficult to sulphurise once the group VB element/matrix combination had been calcined at a temperature of over 200° C.

One preferred method of the invention consists of not calcining the catalyst and of sulphurising using a gaseous compound comprising sulphur, such as $CS_2$, in a pressurised autoclave. Thus a preferred method of the invention consists of sulphurising a mixture, generally in the form of powdered solids, at a temperature in the range 40° C. to 700° C., preferably in the range 60° C. to 500° C., under autogenous pressure and in the presence of a gaseous sulphur compound, preferably $CS_2$.

An autoclave is preferably used which is internally lined with a polymeric material, generally polytetrafluoroethylene, at a temperature of over 100° C. The heating period for the reaction mixture which is necessary for sulphurising depends on the composition of the reaction mixture and the reaction temperature. Such a method, described in the literature for the synthesis of a catalyst comprising niobium sulphide on alumina (Journal of Catalysis, vol. 156, pages 279–289 (1995)) and in European patent EP-A-0 440 516 for the synthesis of a binary sulphur compound, i.e., a simple sulphide comprising sulphur and another element, a transition metal or a rare earth, has been found to be suitable for the synthesis of the mixed sulphides of the present invention.

The supported catalysts of the present invention can be prepared using any of the methods which are known to the skilled person. A number of these processes are described below.

In general, it is possible to mechanically mix the beta zeolite and matrix generally in the form of powder with any precursor of the mixed sulphide phase, then sulphurising, as will be described in more detail below. It is also possible to produce a mechanical mixture comprising the mixed sulphide powder, synthesised using one of the methods described above, and a support (i.e., a mixture of matrix and zeolite) also in the form of a powder, then optionally to form.

In all cases it is possible a priori to add the optional elements present in the supported catalyst of the invention at any stage of the preparation, using methods which are known to the skilled person.

One process for preparing a supported mixed sulphide phase comprised in the catalyst of the present invention comprises the following steps:

a) forming a reaction mixture which comprises at least the following compounds: at least one matrix selected from the group formed by mineral matrices, preferably oxide type matrices, preferably amorphous or of low crystallinity and generally porous, at least one beta zeolite, at least one source of a group VB element, at least one source of a group VIB element, optionally water, optionally at least one element selected from the group formed by group VIII elements, optionally at least one source of an element selected from the group formed by silicon, phosphorous and boron, and optionally at least one source of an element selected from the halogens, i.e., group VIIA elements, preferably fluorine;

b) maintaining said mixture at a heating temperature which is generally over about 40° C., in the presence of a sulphur compound until a solid containing at least one matrix, at least one beta zeolite and at least one mixed sulphide phase is obtained.

Step a) is preferably a support impregnation step.

Thus, for example in the preferred case when the group VB metal is niobium and the group VIB metal is molybdenum, the support (comprising the matrix and the zeolite), or the matrix alone, for example alumina, can be impregnated using ammonium heptamolybdate, then dried at 80° C., then impregnated with niobium oxalate, dried at 80° C., then sulphurised, for example and preferably using $CS_2$ in an autoclave under autogenous pressure, as described for the preparation of the bulk mixed sulphide phase, at 400° C. for 10 hours, for example.

It is also possible to form the mixture of powders comprising the source of the group VB element, the source of the group VIB element, the optional water, the optional source of the element selected from silicon, phosphorous and boron, the optional source of the group VIIA element and the optional sulphur source and then to impregnate the support. It is also possible to impregnate the matrix alone and then to add the beta zeolite, using any means which is known to the skilled person, for example by mechanical mixing.

When the matrix impregnated, the matrix is preferably impregnated using the "dry" impregnating method which is well known to the skilled person. Impregnation can be carried out in a single step using a solution containing all of the constituent elements of the final catalyst.

The supported catalyst of the invention can be formed by extrusion, pelletisation, the oil-drop method, rotating plate granulation or any other method which is known to the skilled person. The pre-formed support is optionally calcined in air, usually at a temperature of at least 300° C., routinely at about 350° C. to 1000° C.

The mixed sulphide, also the group VIII element, also the element selected from the group formed by P, B and Si and the element selected from group VIIA, the halogens, preferably fluorine, can be introduced into the catalyst at various stages in the preparation and in various manners.

The mixed sulphide phase can be introduced only in part (for example when at least one group VB metal and/or group VIB metal is combined with at least one group VIII metal) or completely on mixing the porous support, optionally with all or part of the zeolite.

The group VIII metal, also the element selected from the group formed by P, B, and Si and the element selected from the halogens of group VIIA can be introduced using one or more ion exchange operations carried out on the calcined matrix constituted by the mixed sulphide dispersed in the selected support, using a solution containing at least one precursor salt of the group VIII metal. It can be introduced by at least one operation for impregnating the formed and calcined support, using a solution of a precursor of at least one group VIII metal (in particular cobalt and/or nickel), any group VIII metal precursor preferably being introduced at the same time or after any group VB and VIB metal precursor.

When the metals are introduced in a number of impregnation steps using the corresponding precursor salts, an intermediate drying step for the catalyst is generally carried out at a temperature which is generally in the range 60° C. to 200° C.

The catalyst of the present invention can comprise an element (metal) from group VIII such as iron, cobalt, nickel, ruthenium, rhodium, palladium, osmium, iridium or platinum. Preferred group VIII elements are an element selected from the group formed by iron, cobalt, nickel and ruthenium. Advantageously, combinations of the following elements are used: nickel-niobium-molybdenum, cobalt-niobium-molybdenum, iron-niobium-molybdenum, nickel-niobium-tungsten, cobalt-niobium-tungsten, iron-niobium-tungsten; preferred combinations are: nickel-niobium-molybdenum, cobalt-niobium-molybdenum. It is also possible to use combinations of four elements, for example nickel-cobalt-niobium-molybdenum. Combinations containing a noble metal can also be used, such as ruthenium-niobium-molybdenum, or ruthenium-nickel-niobium-molybdenum.

When the elements are introduced in a plurality of steps for impregnating the corresponding salts, an intermediate catalyst calcining step generally has to be carried out at a temperature in the range 250° C. to 600° C. molybdenum impregnation can be facilitated by adding phosphoric acid to ammonium paramolybdate solutions, which also introduces phosphorous so as to improve the catalytic activity. Other phosphorous compounds can be used, as is well known to the skilled person.

The porous mineral matrix, normally amorphous or of low crystallinity, is in general constituted by at least one refractory oxide in an amorphous or low crystallinity form. Said matrix is normally selected from the group formed by alumina, silica, silica-alumina, or a mixture of at least two of the above oxides. Aluminates can also be used. It is preferable to use matrices containing alumina, in all of its forms which are known to the skilled person, for example gamma alumina.

Sources of the group VB element which can be used are well known to the skilled person. As an example, among the niobium sources, it is possible to use oxides such as diniobium pentoxide $Nb_2O_5$, niobic acid $Nb_2O_5 \cdot H_2O$, niobium hydroxides and polyoxoniobates, niobium alkoxides with formula $Nb(OR_1)_3$ where $R_1$ is an alkyl radical, niobium oxalate $NbO(HC_2O_4)_5$, ammonium niobate. Preferably, niobium oxalate or ammonium niobate are used.

Normally, beta zeolites with a total silicon/aluminium (Si/Al) atomic ratio of more than about 10 are preferably used, more preferably beta zeolites with an Si/Al ratio in the range 10 to 200, and still more preferably in the range 10 to 150. These beta zeolites can be obtained through synthesis or by using any post-synthesis dealumination technique known to the skilled person.

Beta zeolites are advantageously used which are either entirely in the hydrogen form, or possibly partially exchanged with metal cations, for example cations of alkali metals or alkaline-earth metals and/or cations of rare earth metals with an atomic number of 57 to 71 inclusive ("Zeolite Molecular Sieves: Structure, Chemistry and Uses", D. W. Breck, J. Wiley & Sons, 1973). The cation/Al atomic ratio is less than 0.8, preferably less than 0.5 and more preferably less than 0.1. Preferred beta zeolites of the invention have specific surface areas, determined using the BET method, of more than 400 $m^2/g$, preferably in the range about 450 to 850 $m^2/g$.

The sulphur source can be elemental sulphur, carbon disulphide, hydrogen sulphide, sulphur-containing hydrocarbons such as dimethyl sulphide, dimethyldisulphide, mercaptans, thiophene compounds, thiols, polysulphides such as ditertiononylpolysulphide or TPS-37 from ATOCHEM, petroleum cuts which are rich in sulphur such as gasoline, kerosene, or gas oil, used alone or mixed with one of the sulphur-containing compounds cited above. The preferred sulphur source is carbon sulphide or hydrogen sulphide.

The preferred phosphorous source is orthophosphoric acid $H_3PO_4$, but its salts and esters such as ammonium phosphates are also suitable. Phosphorous can, for example, be introduced in the form of a mixture of phosphoric acid and a basic organic compound containing nitrogen such as ammonia, primary and secondary amines, cyclic amines, compounds of the pyridine family and quinolines and compounds from the pyrrole family.

A number of silicon sources can be used. Thus the following can be used: ethyl orthosilicate $Si(OEt)_4$, siloxanes, polysiloxanes, silicones, silicone emulsions or silicates of halides such as ammonium fluorosilicate $(NH_4)_2SiF_6$ or sodium fluorosilicate $Na_2SiF_6$. Silicomolybdic acid and its salts, silicotungstic acid and its salts can also advantageously be used. Silicon can be added, for example, by impregnating with ethyl silicate in solution in an alcohol/water mixture. The silicon can also be added, for example, by impregnation with a silicone type silicon compound suspended in water.

The boron source can be boric acid, preferably orthoboric acid $H_3BO_3$, ammonium biborate or pentaborate, boron oxide, or boric esters. Boron can, for example, be introduced in the form of a mixture of boric acid, hydrogen peroxide and a basic organic compound containing nitrogen, such as ammonia, primary and secondary amines, cyclic amines, pyridine group compounds, quinolines, and pyrrole group compounds. Boron can, for example, be introduced using a solution of boric acid in a water/alcohol mixture.

Sources of group VIIA elements which can be used are known to the skilled person. As an example, fluoride ions can be introduced in the form of hydrofluoric acid or its salts. These salts are of alkaline metals, ammonium salts or salts of an organic compound. In the latter case, the salt is advantageously formed in the reaction mixture by reaction between the organic compound and hydrofluoric acid. Hydrolysable compounds which can liberate fluoride ions in the water can also be used, such as ammonium fluorosilicate $(NH_4)_2SiF_6$, silicon tetrafluoride $SiF_4$ or sodium fluorosilicate $Na_2SiF_6$. Fluorine can be introduced, for example, by impregnating with an aqueous solution of hydrofluoric acid or ammonium fluoride.

Sources of group VIB elements which can be used are well known to the skilled person. Examples of molybdenum and tungsten sources are oxides and hydroxides, molybdic acids and tungstic acids and their salts, in particular ammonium salts such as ammonium molybdate, ammonium heptamolybdate, ammonium tungstate, phosphomolybdic acid, phosphotungstic acid and their salts, silicomolybdic acid, silicotungstic acid and their salts. Preferably, oxides and ammonium salts are used, such as ammonium molybdate, ammonium heptamolybdate and ammonium tungstate.

Sources of group VIII elements which can be used are well known to the skilled person. As an example, non noble metals can be nitrates, sulphates, phosphates, halides (for example chlorides, bromides and fluorides), carboxylates (for example acetates and carbonates). For the noble metals, halides (for example chlorides), nitrates, acids such as chloroplatinic acid, and oxychlorides such as ammoniacal ruthenium oxychloride can be used.

The catalysts of the present invention are formed into grains with different forms and dimensions. They are generally used in the form of cylindrical or polylobed extrudates such as bilobes, trilobes, polylobes with a straight or twisted form, but they can also be produced and used in the form of crushed powders, tablets, rings, beads, and wheels. They have a specific surface area, measured by nitrogen adsorption using the BET method (Brunauer, Emmett, Teller, J. Am. Chem. Soc., vol. 60, 309–316 (1938)), in the range about 50 to about 600 m$^2$/g, a pore volume, measured using a mercury porosimeter, in the range about 0.2 to about 1.5 cm$^3$/g and a pore size distribution which can be unimodal, bimodal or polymodal.

The catalysts of the present invention are used for hydrocracking hydrocarbon feeds such as petroleum cuts. The feeds used in the process are gasolines, kerosenes, gas oils, vacuum gas oils, atmospheric residues, vacuum residues, atmospheric distillates, vacuum distillates, heavy fuels, oils, waxes and paraffins, spent oils, deasphalted residues or crudes, feeds from thermal or catalytic conversion processes and mixtures thereof. They contain heteroatoms such as sulphur, oxygen and nitrogen, and possibly metals.

The catalysts obtained are advantageously used for hydrocracking, in particular vacuum distillate type heavy hydrocarbons, deasphalted or hydrotreated residues or the like. The heavy cuts are preferably constituted by at least 80% by volume of compounds with a boiling point of at least 350° C., preferably in the range 350° C. to 580° C. (i.e., corresponding to compounds containing at least 15 to 20 carbon atoms). They generally contains heteroatoms such as sulphur and nitrogen. The nitrogen content is usually in the range 1 to 5000 ppm by weight and the sulphur content is in the range 0.01% to 5% by weight.

The hydrocracking, conditions such as temperature, pressure, hydrogen recycle ratio, hourly space velocity, can be very variable depending on the nature of the feed, the quality of the desired products and the facilities available to the refiner. The temperature is generally over 200° C., preferably in the range 250° C. to 480° C. The pressure is over 0.1 MPa and preferably over 1 MPa. The quantity of hydrogen is a minimum of 50 and usually in the range 80 to 5000 normal liters of hydrogen per liter of feed. The hourly space velocity is generally in the range 0.1 to 20 volumes of feed per volume of catalyst per hour.

The catalysts of the present invention optionally undergo sulphurisation treatment to transform at least part of the metallic species into the sulphide before bringing them into contact with the feed to be treated. This sulphurisation activation treatment is well known to the skilled person and can be carried out using any method which has already been described in the literature, either in situ, i.e., in the hydrocracking reactor, or ex situ.

One conventional sulphurisation method which is well known to the skilled person consists of heating, in the presence of hydrogen sulphide to a temperature in the range 150° C. to 800° C., preferably in the range 250° C. to 600° C., generally in a traversed bed reaction zone.

The catalyst of the present invention can advantageously be used for hydrocracking vacuum distillate type cuts with high sulphur and nitrogen contents, more particularly cuts with a sulphur content of over 0.1% and with a nitrogen content of over 10 ppm.

In a first partial hydrocracking implementation, also termed mild hydrocracking, the degree of conversion is below 55%. The catalyst of the invention is thus used at a temperature which is generally 230° C. or more, preferably in the range 300° C. to 480° C., and more preferably in the range 350° C. to 450° C. The pressure is generally more than 2 MPa, preferably 3 MPa, and preferably less than 12 MPa, more preferably less than 10 MPa. The quantity of hydrogen is a minimum of 100 normal liters of hydrogen per liter of feed and usually in the range 200 to 3000 normal liters of hydrogen per liter of feed. The hourly space velocity is preferably in the range 0.15 to 10 volumes of feed per volume of catalyst per hour. Under these conditions, the catalysts of the present invention have better activities for conversion, hydrodesulphurisation and hydrodenitrogenation than commercially available catalysts.

In a second implementation, the catalyst of the present invention can be used for partial hydrocracking, advantageously under moderate hydrogen pressure conditions, of cuts such as vacuum distillates containing high sulphur and nitrogen contents which have already been hydrotreated. In this hydrocracking mode, the degree of conversion is below 55%. In this case, the petroleum cut is converted in two steps, the catalysts of the invention being used in the second step. The catalyst of the first step has a hydrotreatment function and comprises a matrix, preferably alumina-based, preferably containing no zeolite, and at least one metal with a hydrogenating function. Said matrix is a porous amorphous or low crystallinity oxide type mineral matrix. Noon limiting examples are aluminas, silicas and silica-aluminas. Aluminates can also be used. Matrices containing alumina are preferred, in all of the forms known to the skilled person, and more preferably aluminas, for example gamma alumina. The hydrotreatment function is ensured by at least one metal or metal compound from group VIII, such as nickel or cobalt. A combination of at least one metal or metal compound from group VIB (for example molybdenum or tungsten) and at least one metal or metal compound from group VIII (for example cobalt or nickel) can be used. The total concentration of groups VIB and VIII metal oxides is preferably in the range 5% to 40% by weight, more preferably in the range 7% to 30% by weight, and the weight ratio, expressed as the metal oxide of the group VIB metal (or metals) to that of the group VIII metal (or metals), is in the range 1.25 to 20, preferably in the range 2 to 10. Further, this catalyst can contain phosphorous. The phosphorous content, expressed as the concentration of phosphorous pentoxide $P_2O_5$, is generally at most 15%, more preferably in the range 0.1% to 15% by weight, and still more preferably in the range 0.15% to 10% by weight. It can also contain boron, preferably in a ratio B/P=1.05–2 (atomic), the sum of the boron (B) and phosphorous (P) contents, expressed as the oxides, preferably being in the range 5% to 15% by weight.

The first step is generally carried out at a temperature of 350–460° C., preferably 360–450° C.; at a total pressure of at least 2 MPa, preferably at least 3 MPa, an hourly space velocity in the range 0.1 to 5 volumes of feed per volume of catalyst per hour, preferably in the range 0.2 to 2 volumes of feed per volume of catalyst per hour, with a quantity of hydrogen at least 100 normal liters per liter of feed, preferably 260 to 3000 normal liters per liter of feed.

In the conversion step using the catalyst of the invention (or second step), the temperatures are generally 230° C. or more and usually in the range 300° C. to 480° C., and preferably in the range 300° C. to 450° C. The pressure is generally at least 2 MPa and preferably at least 3 MPa. The quantity of hydrogen is a minimum of 100 normal liters of hydrogen per liter of feed and preferably in the range 200 to 3000 liters of hydrogen per liter of feed. The hourly space velocity is preferably in the range 0.15 to 10 volumes of feed per volume of catalyst per hour. Under these conditions, the activities of the catalysts of the present invention are better for conversion, hydrodesulphurisation, and hydrodenitrogenation and the selectivity for middle distillates is better than for commercially available catalysts. The service life of the catalysts is also improved in the moderate pressure range.

In a further implementation, the catalyst of the present invention can be used for hydrocracking under high hydrogen pressure conditions, in general at least 5 MPa. The treated cuts are, for example, vacuum distillates containing high sulphur and nitrogen contents which have already been hydrotreated. In this hydrocracking mode, the degree of conversion is more than 55%. In this case, the petroleum cut conversion process is carried out in two steps, the catalyst of the invention being used in the second step.

The catalyst of the first step has a hydrotreatment function and comprises a matrix, preferably alumina-based, preferably containing no zeolite, and at least one metal with a hydrogenating function. Said matrix can also be constituted by, or comprise, a silica, silica-alumina, boron oxide, magnesia, zirconia, titanium oxide or a combination of these oxides. The hydro-dehydrogenating function is ensured by at least one group VIII metal or metal compound such as nickel or cobalt. A combination of at least one metal or metal compound from group VIB (in particular molybdenum or tungsten) and at least one metal or metal compound from group VIII (in particular cobalt or nickel) can be used. The total concentration of group VIB and VIII metal oxides is in the range 5% to 40% by weight, preferably in the range 7% to 30% by weight, and the weight ratio, expressed as the metal oxide of the group VIB metal (or metals) over that of the group VIII metal (or metals), is preferably in the range 1.25 to 20, more preferably in the range 2 to 10. Further, this catalyst can contain phosphorous. The phosphorous content, expressed as the concentration of phosphorous pentoxide $P_2O_5$, is at most 15%, preferably in the range 0.1% to 15% by weight, and more preferably in the range 0.15% to 10% by weight. It can also contain boron in a ratio B/P=1.02–2 (atomic), the sum of the boron (B) and phosphorous (P) contents, expressed as the oxides, preferably being in the range 5% to 15% by weight.

The first step is generally carried out at a temperature in the range 350° C. to 460° C., preferably in the range 360° C. to 450° C.; the pressure is at least 2 MPa, preferably at least 3 MPa; the hourly space velocity is in the range 0.1 to 5 volumes of feed per volume of catalyst per hour, preferably in the range 0.2 to 2 volumes of feed per volume of catalyst per hour; and the quantity of hydrogen is at least 100 normal liters of hydrogen per liter of feed, preferably in the range 260 to 3000 normal liters of hydrogen per liter of feed.

For the conversion step using the catalyst of the invention (or second step), the temperatures are generally 230° C. or more, usually in the range 300° C. to 480° C., and preferably in the range 330° C. to 440° C. The pressure is generally more than 5 MPa, preferably more than 7 MPa. The quantity of hydrogen is a minimum of 100 normal liters of hydrogen per liter of feed, preferably in the range 200 to 3000 liters of hydrogen per liter of feed. The hourly space velocity is preferably in the range 0.15 to 10 volumes of feed per volume of catalyst per hour.

Under these conditions, the activities of the catalysts of the present invention are better for conversion than those of commercially available catalysts.

The following examples illustrate the present invention without in any way limiting its scope.

EXAMPLE 1

Preparation of a support containing a beta zeolite

Large quantities of a hydrocracking catalyst support containing a beta zeolite were produced so as to enable different catalysts based on the same support to be prepared. To this end, 18.9% by weight of a beta zeolite was used which had a total Si/Al ratio (measured by X ray fluorescence) of 23.1, an atomic ratio measured by atomic adsorption of Na/Al= 0.003, a BET surface area of 720 m²/g and a pore volume of 0.298 ml of liquid nitrogen/g (at the temperature of liquid nitrogen) at $P/P_0$=0.14, which was mixed with 81.1% by weight of a matrix composed of ultrafine tabular boehmite or alumina gel sold by Condéa Chemie GmbH under the trade name SB3. This powder mixture was then mixed with an aqueous solution containing 66% nitric acid (7% by weight of acid per gram of dry gel) then mixed for 15 minutes. After mixing, the paste obtained was passed through a die with cylindrical orifices with a diameter of 1.4 mm. The extrudates were dried overnight at 120° C. then calcined at 550° C. for 2 hours in moist air containing 7.5% by volume of water. Cylindrical extrudates 1.2 mm in diameter were obtained with a specific surface area of 286 m²/g, a pore volume of 0.39 cm³/g and a monomodal pore size distribution centred on 11 nm. An X ray diffraction analysis of the matrix revealed that it was composed of low crystallinity cubic gamma alumina with beta zeolite.

EXAMPLE 2

Preparation of hydrocracking catalysts containing a beta zeolite (not in accordance with the invention)

Extrudates of the support containing a beta zeolite prepared in Example 1 were dry impregnated with an aqueous solution of a mixture of ammonium heptamolybdate and nickel nitrate, dried overnight at 120° C. in air and finally calcined at 550° C. in air. The oxide weight contents of catalyst K (NiMo) obtained are shown in Table 1.

We impregnated a sample of catalyst NiMo with an aqueous solution comprising an emulsion of Rhodorsil EP1 silicone so as to deposit about 1.6% by weight of $SiO_2$. After ageing at room temperature in a water-saturated atmosphere, the impregnated extrudates were dried overnight at 120° C. then calcined at 550° C. for 2 hours in dry air. Catalyst L (NiMoSi) was obtained.

Extrudates of the support containing a beta zeolite prepared in Example 1 were dry impregnated with an aqueous solution of a mixture of ammonium heptamolybdate, nickel nitrate and orthophosphoric acid, dried overnight at 120° C. in air and finally calcined at 550° C. in air. Catalyst NiMoP was obtained.

We impregnated a sample of catalyst NiMoP with an aqueous solution comprising ammonium biborate and an emulsion of Rhodorsil EP1 silicone so as to deposit about 1.7% by weight of $B_2O_3$ and 1.5% by weight of $SiO_2$. After ageing at room temperature in a water-saturated atmosphere, the impregnated extrudates were dried overnight at 120° C. then calcined at 550° C. for 2 hours in dry air. Catalyst M (NiMoPBSi) was obtained.

The final oxide contents of the NiMo catalysts are shown in Table 1.

TABLE 1

Characteristics of NiMo catalysts

| Catalyst | K (-) | L (Si) | M (PBSi) |
|---|---|---|---|
| $MoO_3$ (wt %) | 14.2 | 13.9 | 13.2 |
| NiO (wt %) | 3.5 | 3.4 | 3.3 |
| $P_2O_5$ (wt %) | 0 | 0 | 4.1 |
| $B_2O_3$ (wt %) | 0 | 0 | 1.7 |
| $SiO_2$ (wt %) | 15.0 | 16.3 | 15.2 |
| Complement to 100%, mainly composed of $Al_2O_3$ (wt %) | 67.3 | 66.4 | 62.5 |
| Beta zeolite (wt %) | 15.5 | 15.3 | 14.4 |

TABLE 2

Characteristics of NbNiMo catalysts

| Catalyst | Q (Nb) | R (NbSi) | T (NbPBSi) |
|---|---|---|---|
| $Nb_2O_5$ (wt %) | 4.85 | 4.8 | 4.7 |
| $MoO_3$ (wt %) | 13.5 | 13.3 | 12.6 |
| NiO (wt %) | 3.3 | 3.2 | 3.1 |
| $P_2O_5$ (wt %) | 0 | 0 | 3.9 |
| $B_2O_3$ (wt %) | 0 | 0 | 1.6 |
| $SiO_2$ (wt %) | 14.2 | 15.5 | 14.5 |
| Complement to 100%, mainly composed of $Al_2O_3$ (wt %) | 64.1 | 63.1 | 59.5 |
| Beta zeolite (wt %) | 14.8 | 14.6 | 13.6 |

EXAMPLE 3

Preparation of hydrocracking catalysts containing a beta zeolite and niobium (in accordance with the invention)

Extrudates of the support containing a beta zeolite of Example 1 were impregnated with an aqueous niobium oxalate solution $Nb(HC_2O_4)_5$, oxalic acid and ammonium oxalate. The aqueous solution containing niobium was prepared from 1330 ml of water in which 33 g of oxalic acid, 37.2 g of ammonium oxalate and 92.3 g of niobium oxalate had been dissolved. To prepare the solution, the mixture of oxalic acid and ammonium oxalate was dissolved and when the solution had become clear that solution was heated to 55° C. and niobium oxalate was added. It was then made up with water to obtain 1330 ml of solution. The support of Example 1 was then impregnated using the excess method. The 1330 ml of solution was brought into contact with 380 g of catalyst. This deposited about 5% by weight of Nb on the catalyst. After two hours, the extrudates were recovered. These were then dried overnight at 120° C. in a stream of dry air, and finally calcined in dry air at 550° C.

The dried extrudates were dry impregnated with an aqueous solution of a mixture of ammonium heptamolybdate and nickel nitrate, dried overnight at 120° C. in air and finally calcined in air at 550° C. weight contents of the oxides of catalyst Q (Nb) obtained are shown in Table 2.

We impregnated a sample of catalyst Q with an aqueous solution comprising Rhodorsil EP1 silicone emulsion so as to deposit about 1.6% by weight of $SiO_2$. After ageing at room temperature in a water-saturated atmosphere, the impregnated extrudates were dried overnight at 120° C. then calcined at 550° C. for 2 hours in dry air. Catalyst R (NbSi) was obtained Extrudates of the support containing beta zeolite and niobium prepared above were dry impregnated with an aqueous solution of a mixture of ammonium heptamolybdate, nickel nitrate and orthophosphoric acid, dried overnight at 120° C. then calcined in air at 550° C. Catalyst NbNiMoP was obtained.

We impregnated a sample of catalyst NbNiMoP with an aqueous solution comprising ammonium biborate and Rhodorsil EP1 silicone emulsion so as to deposit about 1.7% by weight of $B_2O_3$ and 1.5% by weight of $SiO_2$. After ageing, at room temperature in a water-saturated atmosphere, the impregnated extrudates were dried overnight at 120° C. then calcined at 550° C. for 2 hours in dry air. Catalyst T (NbPBSi) was obtained.

The final oxide contents of the NbNiMo catalysts are shown in Table 2.

EXAMPLE 4

Preparation of a hydrocracking catalyst containing a beta zeolite and a mixed sulphide phase (in accordance with the invention)

Extrudates of the support containing a beta zeolite of Example 1 were dry impregnated with an aqueous solution of a mixture of ammonium heptamolybdate and nickel nitrate and dried overnight at 120° C. in air. The oxide weight contents of catalyst A obtained are shown in Table 3.

Catalyst A was impregnated with an aqueous niobium oxalate solution $Nb(HC_2O_4)_5$, oxalic acid and ammonium oxalate. The aqueous solution containing niobium was prepared from 1330 ml of water in which 33 g of oxalic acid, 37.2 g of ammonium oxalate and 92.3 g of niobium oxalate had been dissolved. To prepare the solution, the mixture of oxalic acid and ammonium oxalate was dissolved and when the solution had become clear that solution was heated to 55° C. and niobium oxalate was added. It was then made up with water to obtain 1330 ml of solution. The support of Example 1 was then impregnated using the excess method. The 1330 ml of solution was brought into contact with 380 g of catalyst. This deposited about 5% by weight of Nb on the catalyst. After two hours, the extrudates were recovered. These were then dried overnight at 120° C. in a stream of dry air. Catalyst B obtained contained, in particular, 14.8% by weight of beta zeolite.

TABLE 3

Characteristics of catalysts (after calcining for 2 hours at 500° C. in dry air)

| Catalyst | A | B | C | H | I | J |
|---|---|---|---|---|---|---|
| $Nb_2O_5$ (wt %) | 0 | 4.7 | 4.9 | 4.6 | 4.4 | 4.7 |
| $MoO_3$ (wt %) | 14.2 | 13.6 | 13.8 | 13.8 | 13.3 | 13.9 |
| NiO (wt %) | 3.5 | 3.3 | 3.5 | 3.3 | 3.2 | 3.3 |
| $P_2O_5$ (wt %) | 0 | 0 | 0 | 0 | 5.1 | 0 |
| $B_2O_3$ (wt %) | 0 | 0 | 0 | 0 | 1.6 | 0 |
| $SiO_2$ (wt %) | 15.0 | 14.3 | 14.8 | 15.3 | 14.2 | 14.7 |
| F (wt %) | 0 | 0 | 0 | 0 | 0 | 1.11 |
| Complement to 100%, mainly composed of $Al_2O_3$ (wt %) | 67.3 | 64.3 | 63.0 | 63 | 58.2 | 62.3 |
| Beta zeolite (wt %) | 15.5 | 14.8 | 14.3 | 14.3 | 13.4 | 14.4 |

EXAMPLE 5

Preparation of hydrocracking catalysts containing a beta zeolite and a group VB element (not in accordance with the invention)

A hydrocracking catalyst containing a beta zeolite and niobium was synthesised. This preparation was carried out by co-mixing a mixture of ultrafine tabular boehmite or alumina gel sold by Condéa Chemie GmbH under the trade name SB3, a beta zeolite as described in Example 1, nickel nitrate, niobium pentoxide and ammonium heptamolybdate. To form the paste, these sources were used so as to obtain a catalyst containing 16% by weight of beta zeolite, 61.5% by weight of alumina, 14% by weight of molybdenum oxide, 3.5% by weight of nickel oxide, and 5% by weight of niobium oxide. After mixing, the paste obtained was passed through a die with cylindrical orifices with a diameter of 1.4 mm. The extrudates were then dried overnight at 120° C. and calcined at 550° C. for 2 hours in moist air containing 7.5% by volume of water. Catalyst C was obtained in the form of cylindrical extrudates 1.2 mm in diameter, with the contents shown in Table 1.

EXAMPLE 6

Preparation of hydrocracking catalysts containing a beta zeolite, a mixed sulphide phase and at least one promoter element (in accordance with the invention)

We impregnated a sample of catalyst A with an aqueous solution comprising an emulsion of Rhodorsil EP1 silicone so as to deposit about 1.6% by weight of $SiO_2$. After ageing at room temperature in a water-saturated atmosphere, the impregnated extrudates were dried overnight at 120° C. then calcined at 550° C. for 2 hours in dry air. Catalyst D was obtained.

Extrudates of the support containing a beta zeolite prepared in Example 1 were dry impregnated with an aqueous solution of a mixture of ammonium heptamolybdate, nickel nitrate and orthophosphoric acid, dried overnight at 120° C. in air and finally calcined at 550° C. in air. Catalyst E was obtained.

We impregnated a sample of catalyst E with an aqueous solution comprising ammonium biborate and an emulsion of Rhodorsil EP1 silicone so as to deposit about 1.7% by weight of $B_2O_3$ and 1.5% by weight of $SiO_2$. After ageing at room temperature in a water-saturated atmosphere, the impregnated extrudates were dried overnight at 120° C. then calcined at 550° C. for 2 hours in dry air. Catalyst F was obtained.

A catalyst containing fluorine was also produced by impregnating catalyst A with a dilute hydrofluoric acid solution so as to deposit about 1% by weight of fluorine. After drying overnight at 120° C. and calcining at 550° C. for 2 hours in dry air, catalyst G was obtained.

Catalysts D and F were then impregnated with an aqueous niobium oxalate solution $Nb(HC_2O_4)_5$, oxalic acid and ammonium oxalate. The aqueous solution containing niobium was prepared from 1330 ml of water in which 33 g of oxalic acid, 37.2 g of ammonium oxalate and 92.3 g of niobium oxalate had been dissolved. To prepare the solution, the mixture of oxalic acid and ammonium oxalate was dissolved and when the solution had become clear that solution was heated to 55° C. and niobium oxalate was added. It was then made up with water to obtain 1330 ml of solution. Catalysts D and F were then impregnated using the excess method. The 1330 ml of solution was brought into contact with 380 g of catalyst. This deposited about 5% by weight of Nb on the catalyst. After two hours, the extrudates were recovered. These were then dried overnight at 120° C. in a stream of dry air. Catalyst H was obtained from catalyst D. It contained, in particular, Nb and Si.

Catalyst I was obtained from catalyst F. In particular, it contained Nb, phosphorous, silicon and boron. Fluorine was then added to this catalyst by impregnating with a dilute hydrofluoric acid solution so as to deposit about 1% by weight of fluorine. After drying overnight at 120° C. in dry air, catalyst J was obtained. The characteristics of catalysts H, I and J are shown in Table 3.

EXAMPLE 7

Comparison of sulphurised catalysts

Catalysts B, C, H, I and J prepared in the above examples were sulphurised in an autoclave under autogenous pressure in the presence of $CS_2$. 20 ml of $CS_2$ per 100 g of catalyst was added to the autoclave, the autoclave was sealed and heated to 400° C., for 10 hours. The internal pressure was about 4 MPa. This sulphurisation step was termed S1.

Other aliquots of catalysts B, C, H, I and J prepared in the above examples were sulphurised in a fixed bed reactor flushed with a stream of gas containing 15% of $H_2S$ in nitrogen at atmospheric pressure. 2 liters per hour of the mixture was passed over each 5 g of catalyst which was heated to 600° C., for 6 hours. This sulphurisation step was termed S2.

EXAFS analysis was carried out at the niobium K edge using synchrotron radiation between 18850 and 19800 eV by measuring the intensity absorbed by a powder sample deposited on an adhesive strip. Interatomic distances could thus be determined. Distances R2 measured by EXAFS for the samples of catalysts B, C, H, I and J sulphurised using method S1 and method S2 respectively are shown in Table 4.

Whatever the sulphurisation method, Table 4 shows that catalysts containing both niobium and molybdenum prepared in accordance with the invention (B, H, I and J) have a metal-metal distance R2 in the sulphide phase which is less than that of catalyst C. The R2 value of 3.32 Å for catalyst C indicates that in that catalyst, the niobium is in the form of a $NbS_2$ phase which is identical to that of a catalyst which would only contain niobium alone. The metal-metal distance R2 of 3.20 Å or 3.21 Å intermediate between the value for $NbS_2$ and $MoS_2$ indicates the presence of a mixed niobium and molybdenum phase in catalysts B, H, I and J.

TABLE 4

| Catalyst sulphurised by method S1 | R2 (Å) | Catalyst sulphurised by method S2 | R2 (Å) |
| --- | --- | --- | --- |
| B-S1 | 3.20 | B-S2 | 3.21 |
| C-S1 | 3.32 | C-S2 | 3.32 |
| H-S1 | 3.19 | H-S2 | 3.20 |
| I-S1 | 3.21 | I-S2 | 3.20 |
| J-S1 | 3.21 | J-S2 | 3.21 |

EXAMPLE 8

Comparison of catalysts for partial conversion hydrocracking of a vacuum gas oil The catalysts prepared in the above Examples were employed under moderate pressure hydrocracking conditions using a petroleum feed with the following principal characteristics:

| | |
| --- | --- |
| Density (20/4) | 0.921 |
| Sulphur (weight %) | 2.46 |
| Nitrogen (ppm by weight) | 1130 |
| Simulated distillation | |
| Initial point | 365° C. |
| 10% point | 430° C. |
| 50% point | 472° C. |
| 90% point | 504° C. |

-continued

| | |
|---|---|
| End point | 539° C. |
| Pour point | +39° C. |

The catalytic test unit comprised two fixed bed reactors in upflow mode. The catalyst for the first hydrotreatment step of the process, HTH548 from Procatalyse, comprising a group VI element and a group VIII element deposited on alumina, was introduced into the first reactor, through which the feed passed first. A hydrocracking catalyst as described above was introduced into the second reactor, through which the feed passed last. 40 ml of catalyst was introduced into each of the reactors. The two reactors operated at the same temperature and the same pressure. The operating conditions of the test unit were as follows:

| | |
|---|---|
| Total pressure | 5 MPa |
| Hydrotreatment catalyst | 40 cm$^3$ |
| Hydrocracking catalyst | 40 cm$^3$ |
| Temperature | 400° C. |
| Hydrogen flow rate | 20 l/h |
| Feed flow rate | 40 cm$^3$/h |

The two catalysts underwent in-situ sulphurisation before the reaction. Once sulphurisation had been carried out, the feed described above could be transformed.

The catalytic performances are expressed as the gross conversion at 400° C. (GC), the gross selectivity for middle distillates (GS) and the hydrodesulphurisation (HDS) and hydrodenitrogenation (HDN) conversions. These catalytic performances were measured for the catalyst after a stabilisation period, generally of at least 48 hours, had passed.

The gross conversion GC is taken to be:

GC=weight % of 380° C.$^{minus}$ of effluent.

The 380° C.$^{minus}$ fraction of the effluent represents the fraction distilled at a temperature of 380° C. or less.

The gross selectivity GS for middle distillates is taken to be:

GS=100* weight of (150° C.–380° C.) fraction/weight of 380° C.$^{minus}$ fraction of effluent.

The hydrodesulphurisation conversion HDS is taken to be:

HDS=($S_{initial}$ - $S_{effluent}$)/$S_{initial}$ * 100=(24600 - $S_{effluent}$)/24600 * 100

The hydrodenitrogenation conversion HDN is taken to be:

HDN=($N_{initial}$ - $N_{effluent}$)/$N_{initial}$ * 100=(1130 - $N_{effluent}$)1130 * 100

Table 5 below shows the gross conversion GC at 400° C., the gross selectivity GS, the hydrodesulphurisation conversion HDS and the hydrodenitrogenation conversion HDN for the four catalysts.

TABLE 5

Catalytic activities of catalysts for partial hydrocracking at 400° C.

| NiMo catalysts | | GC (wt %) | GS (%) | HDS (%) | HDN (%) |
|---|---|---|---|---|---|
| B | Nb | 49.4 | 66.0 | 97.6 | 94.7 |
| C | Nb | 49.4 | 65.2 | 97.0 | 94.2 |
| H | NbSi | 50.0 | 65.4 | 97.8 | 95.0 |
| J | NbF | 50.7 | 65.8 | 98.7 | 96.3 |
| R | NbSi | 51.0 | 64.8 | 99.0 | 96.4 |
| M | PBSi | 50.9 | 64.1 | 99.52 | 98.9 |
| T | NbPBSi | 51.9 | 64.2 | 99.6 | 99.1 |

The results of Table 5 show that the presence of niobium and the promoter (P, B, Si) in the catalyst containing the beta zeolite improves the performances for conversion without substantial reduction in the gross selectivity for middle distillates. The presence of a mixed sulphide phase (catalysts B, H and J) also improves the performances compared with those of catalyst C which does not contain this phase.

The beta zeolite based catalysts of the invention containing a group VB element are thus of particular interest for partial hydrocracking of vacuum distillate type feeds containing nitrogen and in particular under moderate hydrogen pressure.

EXAMPLE 9

Comparison of catalysts for high conversion hydrocracking of a vacuum gas oil

The catalysts prepared as described above were used under high conversion (60–100%) hydrocracking conditions. The petroleum feed was a hydrotreated vacuum distillate with the following principal characteristics:

| | |
|---|---|
| Density (20/4) | 0.869 |
| Sulphur (weight %) | 502 |
| Nitrogen (ppm by weight) | 10 |
| Simulated distillation | |
| Initial point | 298° C. |
| 10% point | 369° C. |
| 50% point | 427° C. |
| 90% point | 481° C. |
| End point | 538° C. |

This feed had been obtained by hydrotreatment of a vacuum distillate using a HR360 catalyst from Procatalyse comprising a group VI element and a group VIII element deposited on alumina.

0.6% by weight of aniline and 2% by weight of dimethyldisulphide were added to the feed to simulate the partial pressures of $H_2S$ and $NH_3$ present in the second hydrocracking step. The prepared feed was injected into the hydrocracking test unit which comprised one fixed bed reactor in upflow mode, into which 80 ml of catalyst had been introduced. The catalyst was sulphurised using a n-hexane/DMDS+ aniline mixture at 320° C. Once sulphurisation had been carried out, the feed described above could be transformed. The operating conditions of the test unit were as follows:

| | |
|---|---|
| Total pressure | 9 MPa |
| Catalyst | 80 cm$^3$ |
| Temperature | 360–420° C. |

| | | |
|---|---|---|
| Hydrogen flow rate | 80 l/h | |
| Feed flow rate | 80 cm³/h | |

The catalytic performances are expressed as the temperature at which a gross conversion of 70% is produced and by the gross selectivity for 150–380° C. middle distillates. These catalytic performances were measured for the catalyst after a stabilisation period, generally of at least 48 hours, had passed.

The gross conversion GC is taken to be:

GC=weight % of 380° C.$^{minus}$ of effluent.

The gross selectivity GS for middle distillates is taken to be:

CS=100* weight of (150° C. –380° C.) fraction/weight of 380° C.$^{minus}$ fraction of effluent.

The reaction temperature was fixed so as to obtain a gross conversion GC of 70% by weight. Table 6 below shows the reaction temperature and gross selectivity for the catalysts described above.

TABLE 6

Catalytic activities of catalysts for high conversion hydrocracking (70° C.)

| NiMo catalysts | | T (° C.) | GS (%) |
|---|---|---|---|
| A | — | 371 | 49.2 |
| B | Nb | 369 | 51.7 |
| C | Nb | 371 | 49.9 |
| J | NbF | 365 | 53.7 |
| K | — | 369 | 51.2 |
| T | NbPBSi | 364 | 54.1 |

The presence of niobium and promoter (P, B, Si) in the catalysts containing beta zeolite improve the conversion activity, meaning a reduction in the reaction temperature required for 70% conversion and improved gross selectivity for middle distillates.

Comparison of catalysts B and C shows that the presence of a mixed sulphide phase of molybdenum and niobium in the catalyst containing a beta zeolite can substantially improve selectivity.

The catalysts of the invention are thus of particular interest for high conversion hydrocracking of a vacuum distillate type feed, in particular at a moderate hydrogen pressure.

What is claimed is:

1. A catalyst comprising at least one beta zeolite, at least one matrix selected from the group formed by mineral matrices, at least one mixed sulphide phase comprising sulphur and at least one group VB element and at least one group VIB element, optionally at least one group VIII metal and optionally at least one element selected from the group formed by silicon, boron and phosphorous, and optionally at least one element from group VIIA of the periodic table.

2. A catalyst according to claim 1, in which the overall silicon aluminum atomic ratio of the beta zeolite is in the range 10 to 200.

3. A catalyst according to claim 1, in which the group VB element is niobium.

4. A catalyst according to claim 1, in which the group VIB element is molybdenum or tungsten and the group VIII element is iron, cobalt or nickel.

5. A catalyst according to claim 1, comprising a mixed sulphide phase with the following approximate general formula:

$A_xB_{1-x}S_y$ where:
x is a number in the range 0.001 to 0.999;
y is a number in the range 0.1 to 8;
A is a group VB element;
B is an element selected from group VIB.

6. A catalyst according to claim 1, further comprising at least one element from group VIII of the periodic table.

7. A catalyst according to claim 1, in which the matrix is alumina.

8. A catalyst according to claim 1, further comprising at least one element selected from the group formed by silicon, boron and phosphorous.

9. A catalyst according to claim 1, further comprising at least one group VIIA element.

10. A catalyst according to claim 1, comprising, in weight % with respect to the total catalyst mass:
0.1% to 99.9% of at least one matrix;
0.1% to 99.8% of at least one beta zeolite with a lattice parameter in the range 2.424 nm and 2.455 nm and with an overall SiO$_2$/Al$_2$O$_3$ molar ratio of more than 8;
0.1% to 99.5% of at least one mixed sulphide phase of at least one group VB element and at least one group VIB element;
0 to 30% of at least one group VIII element;
0 to 20% of at least one element selected from the group formed by boron, phosphorous and silicon; and
0 to 15% of at least one element selected from group VIIA.

11. A process for preparing a bulk mixed sulphide phase comprised in the catalyst of claim 10, comprising the following steps:
a) forming a reaction mixture which comprises at least the following compounds: at least one source of a group VB element, at least one source of a group VIB element, optionally water, optionally at least one element selected from the group formed by group VIII elements, optionally at least one source of an element selected from the group formed by silicon, phosphorous and boron, and optionally an element selected from the halogens, i.e., group VIIA elements;
b) maintaining said mixture at a heating temperature which is generally over about 40° C., at a pressure which is at least equal to atmospheric pressure and in the presence of a sulphur compound until the mixed sulphide is obtained.

12. A process for preparing a supported mixed sulphide phase comprised in the catalyst of claim 10, comprising the following steps:
a) forming a reaction mixture which comprises at least the following compounds: at least one matrix selected from the group formed by mineral matrices, preferably oxide type mineral matrices, preferably amorphous or of low crystallinity and generally porous, at least one beta zeolite with a lattice parameter in the range 2.424 nm and 2.455 nm, with an overall SiO$_2$/Al$_2$O$_3$ molar ratio of over 8, at least one source of a group VB element, at least one source of a group VIB element, optionally water, optionally at least one element selected from the group formed by group VIII elements, optionally at least one source of an element selected from the group formed by silicon, phosphorous and boron, and optionally at least one source of an element selected from the halogens, i.e., group VIIA elements;

b) maintaining said mixture at a heating temperature which is generally over about 40° C., in the presence of a sulphur compound until a solid containing at least one matrix, at least one beta zeolite and at least one mixed sulphide phase is obtained.

13. A process according to claim 11, in which the mixture is sulphurised at a temperature in the range 40° C. to 700° C., under autogenous pressure, and in the presence of $CS_2$.

14. A catalyst as obtained from the process of claim 11.

15. A catalyst as obtained from the process of claim 12.

16. A catalyst according to claim 1 wherein the group VB element is niobium, the group VIB element is molybdenum, and the matrix is alumina.

17. A catalyst according to claim 1 wherein the group VB element is niobium, the group VIB element is molybdenum, and the group VIII element is nickel.

18. A catalyst according to claim 1 wherein the group VB element is niobium, the group VIB element is molybdenum, and the group VIII element is cobalt.

19. Employing a catalyst according to claim 1 in a process for hydrocracking hydrocarbon feeds.

20. A process according to claim 19 in which the temperature is over 200° C., the pressure is over 0.1 MPa, the quantity of hydrogen is a minimum of 50 liters of hydrogen per liter of feed, and the hourly space velocity is in the range 0.1 to 20 volumes of feed per volume of catalyst per hour.

21. A process according to claim 19 in a mild hydrocracking process in which the degree of conversion is less than 55%, in which the temperature is over 230° C., the pressure is over 2 MPa and less than 12 MPa, the quantity of hydrogen is a minimum of 100 liters of hydrogen per liter of feed, and the hourly space velocity is in the range 0.15 to 10 volumes of feed per volume of catalyst per hour.

22. A process according to claim 19 in a hydrocracking process in which the degree of conversion is over 55%, in which the temperature is over 230° C., the pressure is over 5 MPa, the quantity of hydrogen is a minimum of 100 liters of hydrogen per liter of feed, and the hourly space velocity is in the range 0.15 to 10 volumes of feed per volume of catalyst per hour.

23. A process according to claim 19, in which hydrotreatment is carried out, at a temperature in the range 350° C. to 460° C., a pressure of at least 2 MPa, with a quantity of hydrogen of at least 100 liters of hydrogen per liter of feed, and an hourly space velocity in the range 0.1 to 5 volumes of feed per volume of catalyst per hour, this step being prior to the hydrocracking step.

* * * * *

UNITED STATES PATENT AND TRADEMARK OFFICE
CERTIFICATE OF CORRECTION

PATENT NO. : 6,231,750 B1
APPLICATION NO. : 09/344344
DATED : May 15, 2001
INVENTOR(S) : Slavik Kasztelan et al.

It is certified that error appears in the above-identified patent and that said Letters Patent is hereby corrected as shown below:

Column 23, line 61, "silicon aluminum" should read --silicon/aluminum--.

Signed and Sealed this

Thirty-first Day of July, 2007

JON W. DUDAS
*Director of the United States Patent and Trademark Office*